United States Patent Office 3,753,851
Patented Aug. 21, 1973

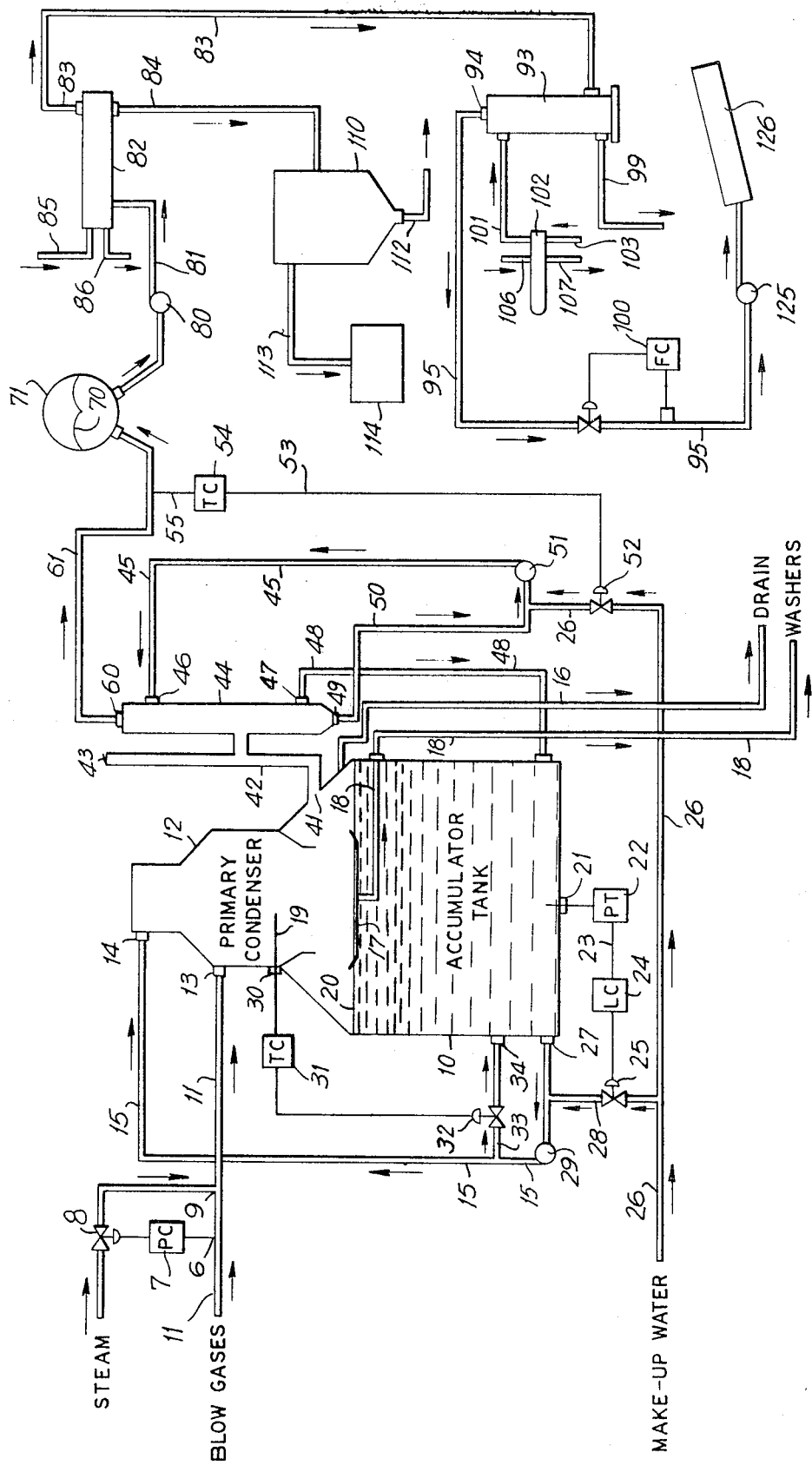

3,753,851
METHOD FOR TREATING PULP
DIGESTER BLOW GASES
Charles S. Gaillard, New York, N.Y., assignor to
Westvaco Corporation, New York, N.Y.
Filed Oct. 22, 1971, Ser. No. 191,728
Int. Cl. D21c 11/08
U.S. Cl. 162—15         5 Claims

ABSTRACT OF THE DISCLOSURE

Disclosed is a process for treating hot, odoriferous blow gases from a pulp digester whereby a significant portion of the available heat is recovered, turpentine is recovered, a portion of the odoriferous gases are removed and recovered and the remaining gases are burned resulting in further heat recovery. The digester blow gases containing water vapor, turpentine vapor and gaseous odoriferous sulphur compounds are passed through a series of direct condensers to a gas storage means before being conducted to an indirect condenser. The uncondensed gases leaving the indirect condenser are scrubbed while the condensate mixture leaving the indirect condensor is conducted to a turpentine separating means.

BACKGROUND OF THE INVENTION (1) Field to which the invention pertains

In the process of manufacturing wood pulp, trees are de-barked and reduced to chips. Subsequently, these wood chips may be loaded into a vessel known in the paper-making industry as a digester. It is the purpose of the digestion process to cook the chips and achieve the partial removal from the wood chips of the chemical substances which bind the wood fibers together, the aforesaid chemical substance largely being comprised of a chemical generally referred to as lignin. At the end of the cooking period the contents of the digester are released (blown) to atmospheric pressure. The pulp or cellulose fibers are then separated from the spent cooking liquor and dissolved lignin by mechanical means. This method of pulping is generally known in the paper industry as chemical pulping.

Most pulp digesters in use today are of the batch type, i.e. they are large vessels capable of withstanding high internal pressure. In operation, these vessels are loaded with a charge of wood chips and cooking chemicals. When the pulping process is of the chemical or kraft type, the chemical most often utilized is a solution of sodium sulfide, sodium hydroxide and sodium carbonate, commonly referred to as white liquor. When the vessel has been charged and sealed, it is heated to temperatures as high as 360° F. and the pressure within the vessel is elevated to pressures as high as 150 p.s.i.

During the cook, numerous chemical reactions occur with the result that a certain amount of gas is generated. Relief of these gases along with the air present in the digester at the start of the cook is an essential part of the digestion process. In the art, these gases are referred to as relief gases.

At the end of the cook, the digester is generally vented to a so-called blow tank. Thus, the blow tank will contain the digested wood chips, the spent cooking liquor or black liquor as it is called and a quantity of hot gases which often contain a rich concentration of a number of materials, e.g. turpentine, hydrogen sulfide, dimethyl sulfide, methyl mercaptan and dimethyl disulfide. Thus, the industry is faced with the problem of how to dispose of these blow gases and recover any available heat and useable chemicals while nevertheless avoiding the discharge to the atmosphere of odoriferous gases. A method of achieving these objectives is the field to which my invention pertains.

(2) Prior art

Apparatus and methods heretofore developed for the disposal of pulp digester blow gases had as their primary criteria the efficient recovery of available heat and useable chemicals. For example, the following patents disclosed systems and process whereby heat recovery and/or chemical recovery is achieved—U.S. Pats. 3,492,198, 3,172,802, 3,313,680, 1,685,754, 1,576,643, 1,119,977 2,996,423 and U.S. Pat. Re. 20,123.

While all of the systems and processes disclosed by the above mentioned patents achieve a degree of heat and chemical recovery from digester blow gases, it will be appreciated that these systems were designed at a time when the subject of air pollution was not receiving particular attention. Thus, these systems generally contemplate apparatus arrangements wherein odoriferous gases may be discharged to the atmosphere. For example, in U.S. Pat. 3,492,198 to Rosenblad, there is disclosed a system wherein both relief gases and blow gases may be passed through one or more condensers whereby available heat in the blow gases is recovered through the mechanism of heating a coolant, for example water, in a direct contact condenser. Subsequently, the cooled gas stream may pass through a second, indirect condenser wherein the remaining blow gases are cooled to a temperature below the condensation temperature of turpentine and thus turpentine recovery is achieved. However, the remaining gases, which are untreated, are vented to the atmosphere. Thus, if the digester blow gases contain uncondensable, odoriferous gases such as hydrogen sulfide or methyl mercaptan (as would be the case with softwood pulp digester blow gases), these odoriferous gases would be discharged to the atmosphere thus contributing to air pollution.

SUMMARY OF THE INVENTION

Hardwood or softwood pulp digester blow gases are supplied to a direct contact condenser wherein a major portion of the blow gases are condensed through a direct contact with a coolant such as water. Thus, substantial heat recovery is achieved. This first direct contact condenser is operated such that the uncondensed fraction of the blow gases leaving the condenser are at a temperature substantially above the condensation temperature of turpentine.

The aforementioned uncondensed fraction of the blow gases from the first direct contact condenser are passed through a second direct contact condenser which is operated such that not all of the aforementioned uncondensed fraction passing through is condensed. More particularly, the remaining uncondensed fraction leaving the second direct condenser is maintained at a temperature just slightly above the condensation temperature of the turpentine in the remaining uncondensed fraction.

The remaining uncondensed fraction is passed to a gas storage means, such as a vapor sphere. The vapor sphere provides a process capacitance which is required to minimize the size of subsequent processing equipment and to permit operation over a wide range of gas flow rates. From the gas storage means, the aforementioned remaining uncondensed fraction is passed to a indirect condenser operated such that the gas passing therethrough is cooled below the condensation temperature of turpentine thus forming a turpentine-condensate mixture which may be subsequently treated to separate the turpentine, e.g. by decanting. The uncondensed gases leaving the indirect or surface condenser are largely comprised of odoriferous and inflammable gases. These gases are passed through a scrubber to reduce the concentration of uncondensed, odoriferous gases to a level of controllable flammability. Gases discharged from the scrubber are subsequently burned, thus recovering the heat of combustion of the gases and simultaneously converting them to non-odoriferous gases.

DESCRIPTION OF THE DRAWINGS

FIG. 1 is a schematic representation of the equipment and process steps which comprise the preferred embodiment of my invention.

DESCRIPTION OF THE PREFERRED EMBODIMENT

Referring to FIG. 1, a conduit 11 supplies blow gases to my system from blow tanks which are not shown. As heretofore pointed out, pulp digesting is generally a batch process. Therefore, it will be appreciated that the flow rate of blow gases is subject to wide variation. For example, it is common to encounter digesting operations wherein the flow rate of blow gases will vary from as low as a hundred c.f.m. to as high as 200,000 c.f.m. Therefore, if one wishes to avoid air entrainment within the blow gas recovery system, one may wish to use a steam purging system as shown in FIG. 1 wherein the pressure within the blow gas supply line 11 is measured, as at 6, and the pressure signal is supplied to a pressure controller 7 whose output manipulates a valve 8 that regulates the steam injected into the blow gas line 11 as at 9.

The blow gases supplied to my system through the conduit 11 are first conducted to a primary or first direct condenser 12. In a typical installation, the blow gases entering the primary condenser, for example at 13, are at a temperature of 212° F. Within the upper portion of the primary condenser 12, the blow gases are directly contacted by a coolant, for example water, wherein the coolant is supplied to the top of the primary condenser 12 as at 14. As the coolant passes down through the direct condenser 12 and contacts the blow gases, there is, of course, a heat exchange between the coolant and the blow gases. Within the lower portion of the primary condenser 12, heated coolant may be collected by the trough 17 and conducted from the primary condenser by the conduit 18 to insure a supply of hot water for use in other unit processes, e.g. washers or blow heat evaporators. In the primary condenser which I have chosen to employ, the design of the trough 17 is such as to allow a portion of the heated coolant to pass into an accumulator tank 10 where it may accumulate to a predetermined level, for example as indicated at 20.

Those skilled in the art will perceive that the temperature of the heated coolant exiting the primary condenser 12 provides an indication of the heat transfer operation which is occurring in the upper part of the primary condenser. Thus, in order to satisfy objectives which will be hereinafter described in more detail, a temperature sensor 19, e.g. a thermocouple, is mounted in the wall of the primary condenser as at point 30 and provides to temperature controller 31 a signal representative of the temperature of the heated coolant as it leaves the primary condenser 12. The temperature controller 31 manipulates a flow control valve 32 so as to control the flow of coolant to the primary condenser. More specifically, a primary condenser pump 29 continuously withdraws accumulated and cooled coolant from the base of the accumulator tank 10 as at 27. The primary condenser pump 29 discharges through conduit 15 thus supplying a flow of coolant to the top of the primary condenser 12 as at 14. However, downstream of the discharge side of the primary condenser pump 29, the line 15 is tapped by line 33 which is essentially, a recirculation line back to the accumulator tank 10, as at 34. The recirculation flow rate, and thus the flow of coolant through the line 15, is controlled by manipulation of the flow control valve 32 in response to control signals from the temperature controller 31. As such, control of the heat transfer or condensation process within the primary condenser 12 may be achieved. Still more specifically, in accordance with my process, the temperature set point provided to the temperature controller 31 is maintained above the condensation temperature of the turpentine fraction in the blow gases supplied to the primary condenser 12. Further, since the aforementioned temperature set point will essentially determine the temperature of the heated coolant collected in the trough 17, external process conditions (e.g. blowheat evaporator, or washer operating conditions) associated with the use of the heated coolant collected in the trough 17 will generally determine the temperature set point subject, of course, to the limitation that it is above the condensation temperature of the turpentine fraction in the blow gas. In a representative installation, I have used the temperature of 205° F. as the temperature set point to the temperature controller 31.

Since a portion of the heated coolant is collected in the trough 17 and conducted outside of the primary condenser 12 through the line 18, it becomes necessary to provide make-up coolant. Thus, in the preferred embodiment of my invention as shown in FIG. 1, I provide a pressure tap 21 in the base of the accumulator tank 10, whereby a pressure signal indicative of the level of the accumulated coolant is provided to a pressure transmitter 22. Pressure transmitter 22 supplies a pressure signal 23 to a level controller 24 wherein there is generated a level control signal that is applied to a flow control valve 25. Manipulation of the flow control valve 25 controls the flow of make-up water through line 28 thus insuring that the desired level 20 is maintained.

Returning to a consideration of the heat transfer or condensation process which occurs in the primary condenser 12, it will be appreciated that if the temperature of the heated coolant is maintained above the condensation temperature of the turpentine fraction within he blow gas, but below the boiling point of water, for example, if the temperature of the heated coolant is maintained at approximately 205° F., a major portion of the blow gases supplied to the primary condenser 12 will be condensed thus providing a high volume source of hot water for other unit processes and simultaneously minimizing the volume of uncondensed blow gases which must be subjected to subsequent treatment.

That fraction of the blow gases which is not condensed within the primary condenser 12, exits therefrom as at 41 into a standpipe 42 which may be provided with a pressure relief flapper 43. In any event, the aforementioned uncondensed portion of the blow gases are, according to my invention, passed to a second direct condenser 44. Within the second, direct condenser 44, the uncondensed portion of the blow gases from the primary condenser may pass countercurrently with respect to a coolant supplied to the secondary condenser 44 as at 46.

While the configuration of the second direct condenser 44 may take any of a number of forms, it is critical to the process of my invention that the condenser be operated such that the temperature of the remaining uncondensed fraction of the blow gases leaving the secondary condenser 44 is maintained at a temperature just slightly above the condensation temperature of the turpentine fraction in the remaining uncondensed fraction. Thus, in FIG. 1, the remaining uncondensed fraction of the blow gases exits from the secondary condenser 44, as at 60, into line 61 wherein the temperature of the remaining uncondensed fraction is measured at 55. A signal representative of the temperature of the remaining uncondensed fraction as measured at point 55 is supplied to a temperature controller 54 wherein it is compared to a temperature set point which, according to my process, is slightly greater than the condensation temperature of the turpentine fraction in the remaining uncondensed fraction. Based upon this comparison, the temperature controller 54 provides a control signal 53 to a flow control valve 52. Flow control valve 52 controls the flow of make-up water through the line 26 to the secondary condenser pump 51. As may be clearly seen in FIG. 1, the secondary condenser pump 51 has its suction side connected to both make-up line 26 and return line 50. Thus, the temperature of the coolant discharged into the coolant supply line 45 from the secondary condenser pump 51 will be determined by the position of the flow control valve 52. Recognizing that there is provided means for controlling the temperature of the coolant supply in line 45 in response to the temperature of the remaining uncondensed fraction of the blow gases in line 61, it will be perceived that the condensation process which occurs within the secondary condenser 44 is controlled in response to the temperature of the remaining uncondensed fraction of the blow gases discharged from the secondary condenser 44.

Since some condensation will occur in the secondary direct contact condenser 44, an overflow, as at 47, is provided whereby excess coolant is discharged to the line 48 and thereafter to the accumulator tank 10 which is equipped with an overflow line 16 while the remainder of the coolant from the secondary direct condenser 44 is discharged as at point 49 to the conduit 50 whereby it is returned to the suction side of the secondary condenser pump 51.

As hereinbefore observed, most pulp digester operations function in a manner which creates wide swings in the flow rate of blow gases. Thus, prior art blow gas treatment systems which have been designed to handle the maximum flow rate which may be encountered are such that one or more pieces of equipment are seldom operated at their design capacity. To avoid this inefficiency, my process contemplates the provision of a gas storage means which, essentially, has the capacity for absorbing or flattening out wide variations in the flow rate of blow gases. For example, referring to FIG. 1, the remaining uncondensed portion of the blow gases passing from the secondary condenser 44 through line 61 are stored in a vapor storage means 71. In the preferred embodiment of my invention, I have found it most economical to use a vapor sphere wherein the stored gas is maintained at, essentially, atmospheric pressure by expanding against a flexible diaphragm 70. The gas within the sphere 71 may be withdrawn therefrom by a gas blower 80 which discharges the gas through line 81 to a indirect condenser 82. The condensation process within the indirect condenser 82 operates subject to the criterion that the gases supplied to the indirect condenser 82 are cooled below the condensation temperature of the turpentine in such gases. Therefore, the cooling medium supplied through the line 85 to the indirect condenser 82 is accordingly temperature controlled. As a result of operating in accordance with the aforementioned criterion, there will be formed within the indirect condenser 82 a turpentine-condensate mixture which may be discharged through the line 84. Gases which are not condensed within the primary condenser 82 are substantially comprised of non-condensable gases and, in most cases, such gases will be highly odoriferous, e.g. hydrogen sulfide, methyl mercaptan, dimethyl sulfide and dimethyl disulfide.

Considering the turpentine-condensate mixture formed within the indirect condenser 82, this mixture may be conducted by a conduit 84 to a turpentine separating process. In the preferred embodiment of my invention as shown in FIG. 1, line 84 conducts the turpentine-condensate mixture to a decanter 110, of a type commonly used, wherein the turpentine is withdrawn from the top through a line 113 to a turpentine storage means 114 and the condensate is withdrawn from the lower portion through a line 112. Thus, recovery of saleable turpentine is achieved.

Returning to the operation of the indirect condenser 82, it was previously indicated that uncondensed and odoriferous gases were conduted therefrom through a line 83. In the past, prior art systems had discharged such gases directly to the atmosphere. However, through the process of my invention, atmospheric discharge of such gases is avoided.

In a typical installation, the concentration of the non-condensable gases in the line 83 may be quite high. At such concentrations, if the gases within the line 83 were mixed with air, there would be produced a gaseous mixture which was far too flammable for direct, safe incineration. Additionally, if all these gases were burned, chemical recovery of the compounds which form such gases would be precluded. Therefore, in accordance with the preferred embodiment of my process and as shown in FIG. 1, the remaining, uncondensed blow gases in line 83 are passed to a scrubbing tower 93 wherein they are scrubbed with a caustic scrubbing agent, e.g. white liquor. In the scrubbing process step, some of the odoriferous gases are removed, e.g. hydrogen sulfide and methyl mercaptan, while the remainder of the non-condensable, odoriferous gases pass from the tower 93. In this manner, the excess flammability problem is solved by reducing the concentration of the non-condensable gases. Moreover, if a scrubbing agent such as white liquor is employed, the white liquor leaving the tower 93 will be enriched by the sulfur compounds scrubbed from the blow gases and the enriched white liquor may be returned to the digesters (not shown in FIG. 1). Through this procedure, less sulfur compounds need to be added to the white liquor and a chemical recovery and monetary saving are thus achieved.

A further beneficial method of operating the scrubbing process would involve the step of maintaining the temperature of the gas discharged from the tower at a temperature not greater than the temperature of the gases feeding the tower. In this manner, the specific volume of the gases discharged from the tower 93 is not excessive, thus reducing the size of equipment downstream from the tower.

Thus, a caustic scrubbing agent, such as white liquor, is supplied to the scrubbing tower through line 101 and descends through the tower scrubbing the uncondensed gases rising through the tower and recovering the chemicals in those gases. The scrubbing agent leaves the tower 93 through line 99. The scrubbed, uncondensed gases pass from the tower 93, as at 94, into a line 95. In a typical installation, the gases leaving the scrubbing tower have had their concentration of non-condensable gases reduced by more than 90%. Therefore, the remaining odoriferous, non-condensable, flammable gases (largely dimethyl sulfide and dimethyl disulfide) can be incinerated thus extracting their heat of combustion while converting them into non-offensive gases. A convenient way to achieve this objective in a paper mill is to burn the gases in a lime kiln. Thus, in FIG. 1, the gases are passed, subject to a flow control loop 100, to the suction side of an air fan 125 and are discharged therefrom to a lime kiln 126 wherein they are incinerated.

With further regard to the scrubbing process, as was hereinbefore pointed out, the volume of the gas discharged from the tower 93 can be minimized if the temperature of such gases is approximately equal to the temperature of the gases fed to the tower. One method of achieving this objective is to pass the scrubbing agent through a heat exchanger before it enters the tower. Thus, in FIG. 1, there is shown a heat exchange 102 through which a coolant is passed from 106 to 107. The scrubbing agent, if hot, is supplied through line 103 to the heat exchanger 102 and is discharged therefrom through line 101. If needed, the operation of the heat exchanger 102 may be automatically controlled by measuring the temperature of the gas in line 94 and, in response thereto, regulating the flow of coolant through the line 106.

Having set forth those steps which comprise the preferred embodiment of my invention, it will be appreciated that the practice of my process intrinsically provides a number of advantages both with respect to the equipment which is utilized and the results which are obtained. For example, through the use of two direct condensers rather than a single direct condenser, large quantities of hot water may be obtained while nevertheless maintaining good temperature control of the temperature of the gases which discharge from the second direct condenser. Second, since the secondary condenser is direct rather than an indirect condenser, the cost thereof is minimized. Third, by maintaining the temperature of the gases which discharge from the secondary condenser at a temperature slightly greater than the condensation temperature of the turpentine contained in such gases, the size or capacity of subsequent processing units may be reduced to a minimum. Additionally, the use of a vapor storage means after the second direct condenser, further permits a reduction in the size of subsequent processing units. Still further, the use of a scrubbing tower for treating the gas discharge from the indirect condenser recovers chemicals and in addition permits the safe incineration or burning of a portion of the non-condensable gases thus providing further heat recovery. Moreover, the scrubbing-incineration process steps insure that odoriferous gases are not discharged to the atmosphere. Thus, the use of my process provides maximum heat and chemical recovery while nevertheless eliminating the possibility of air pollution.

Although I have hereinbefore set forth the preferred embodiment of my invention as well as a number of modifications thereto, it will be apparent that still other modifications will be obvious to those skilled in the art to which my invention pertains. Thus, it is to be understood that my process as hereinbefore described represents only certain embodiments of my invention, the entire scope of which is to be edtermined from the claims appended hereto.

I claim:

1. The method of treating pulp digester blow gases containing water vapor, turpentine vapor and gaseous odoriferous sulfur compounds which comprises:
    (a) conducting said blow gases to a first direct condenser;
    (b) condensing a major portion of said water vapor in the blow gases by contacting said blow gases in said first direct condenser with a coolant water thereby heating said coolant water;
    (c) conducting all of said turpentine vapor, gaseous odoriferous sulfur compounds, and an uncondensed fraction of water vapor of said blow gases from said first direct condenser to a second direct condenser;
    (d) maintaining the temperature of the said turpentine vapor, gaseous odoriferous sulfur compounds, and uncondensed fraction of water vapor exiting said first direct condenser at a temperature substantially greater than the condensation temperature of turpentine, about 170 degrees F.;
    (e) condensing a major portion of said uncondensed fraction of water vapor exiting said first direct condenser and entering said second direct condenser by contacting the said turpentine vapor, gaseous odorifier ous sulfur compounds, and uncondensed fraction of water vapor with a coolant water.
    (f) conducting said turpentine vapor and gaseous odoriferous sulfur compounds and a remaining uncondensed fraction of water vapor from said second direct condenser to a gas storage means;
    (g) maintaining the temperature of the turpentine vapor and gaseous odoriferous sulfur compounds and remaining uncondensed fraction of water vapor exiting said second direct condenser at a temperature slightly greater than the condensation temperature of turpentine, about 160 degrees F.;
    (h) conducting said turpentine vapor, gaseous odoriferous sulfur compounds and remaining uncondensed fraction of water vapor from said gas storage means to an indirect condenser;
    (i) cooling said turpentine vapor, gaseous odoriferous sulfur compounds and remaining uncondensed fraction of water vapor in said indirect condenser to a temperature below the condensation temperature of turpentine, about 140 degrees F., to form a turpentine-condensate mixture;
    (j) conducting an uncondensed fraction of turpentine vapor, said gaseous odoriferous sulfur compounds and a residual uncondensed fraction of water vapor not condensed in said indirect condenser to a gas scrubber;
    (k) scrubbing said uncondensed fraction of turpentine vapor, gaseous odoriferous sulfur compounds and residual uncondensed fraction of water vapor from said indirect condenser with a caustic scrubbing agent to produce a burnable gas exiting said gas scrubber below the flammability limit of a lime kiln;
    (l) burning said burnable gas discharged from said gas scrubber in a lime kiln;
    (m) conducting said turpentine-condensate mixture from said indirect condenser to a turpentine separating means; and
    (n) separating the turpentine fraction from said turpentine-condensate mixture.

2. The method of claim 1 wherein the temperature of the uncondensed turpentine vapor, gaseous odoriferous sulfur compounds and water vapor exiting the first direct condenser is maintained by controlling the flow of the coolant water supplied to said first direct condenser.

3. The method of claim 1 which further comprises the step of maintaining the turpentine concentration of the scrubbed gases discharged from said scrubber below the flammability limit of the lime kiln.

4. The method of claim 1 wherein step (d) thereof the temperature of said turpentine vapor, gaseous odoriferous sulfur compounds and uncondensed fraction of water vapor discharged from said first direct condenser is maintained above about 170 degrees F. to avoid turpentine concentration buildup in the process water.

5. The method of claim 1 wherein step (g) thereof the temperature of the uncondensed turpentine vapor, gaseous odoriferous sulfur compounds and water vapor exiting the second direct condenser is maintained by controlling the flow of the coolant water supplied to the second direct condenser.

References Cited
UNITED STATES PATENTS

| 3,492,198 | 1/1970 | Rosenblad | 162—15 |
| 3,183,145 | 5/1965 | Collins, Jr. | 162—51 X |
| 2,996,423 | 8/1961 | Nyquist | 162—52 |
| 3,607,617 | 9/1971 | Drew | 162—15 |

FOREIGN PATENTS

| 673,649 | 1/1930 | France | 162—15 |

S. LEON BASHORE, Primary Examiner

R. V. FISHER, Assistant Examiner

U.S. Cl. X.R.

159—47; 162—51, 239; 203—14